United States Patent [19]
Blount

[11] 3,789,218
[45] Jan. 29, 1974

[54] TRACKER BALL ARRANGEMENTS

[75] Inventor: Eric Albert Blount, Chelmsford, England

[73] Assignee: The Marconi Company Limited, Essex, England

[22] Filed: Apr. 3, 1972

[21] Appl. No.: 240,615

[30] Foreign Application Priority Data
June 12, 1971  Great Britain............... 27,651/71

[52] U.S. Cl. .......................... 250/231 SE, 250/237
[51] Int. Cl. ............................................. G01d 5/34
[58] Field of Search.. 250/230, 231 R, 231 SE, 237; 74/5.6; 356/28; 33/317, 325

[56] References Cited
UNITED STATES PATENTS
3,304,434  2/1967  Koster........................... 250/231 SE
3,192,393  6/1965  Broderson........................... 250/230
3,193,744  7/1965  Seward........................... 250/231 SE
3,454,777  7/1969  Marcus........................... 250/231 SE X Primary Examiner—James W. Lawrence
Assistant Examiner—D. C. Nelms
Attorney, Agent, or Firm—Baldwin, Wight & Brown

[57] ABSTRACT

A tracker ball, supported by a caster, drives two mutually perpendicular conical members, each mounted on a stub axle carrying an apertured disc. Light shone through each disc is detected by two photodetectors, the frequency and order of the detected light representing the ball movement. The conical members may be formed on the axles themselves, which may be mounted in opposite walls or both in the same wall of the ball housing.

5 Claims, 5 Drawing Figures

TRACKER BALL ARRANGEMENTS

This invention relates to tracker ball arrangements.

Tracker ball arrangements are well known in which a ball which may be rotated in any direction about any horizontal axis drives movement sensing means. Tracker ball arrangements at present known, however, are unduly complex and require relatively complicated machining operations, are often undesirably large and relatively heavy.

The present invention seeks to provide improved tracker ball arrangements of simplified construction.

According to this invention a tracker ball arrangement comprises a housing, a ball within said housing, first movement sensing means driven by a first rotatable conical member having a conical surface in contact with said ball and second movement sensing means driven by a second conical member have a conical surface in contact with said ball, the conical surfaces of the two conical members having an angle of 90° between them. The conical members may be carried from opposite side walls of the housing or from the same side wall of the housing.

Preferably said movement sensing means in each case comprises, within said housing, a coded element e.g. an apertured disc fixed to a respective conical member, so as to rotate therewith, and means for detecting light passing through said apertured disc, there being provided means for illuminating that side of said disc opposite to said light detecting means.

Where said conical members are carried from opposite walls of the housing the illuminating means for said apertured disc may conveniently be a single light source. Where, however, the conical members are carried from a common wall of said housing independent light sources are preferably provided for each apertured disc.

Preferably said ball rests on a caster provided on the base of said housing and preferably said ball is biased towards said conical members by a spring loaded bearing.

Where said apertured discs are within said housing normally each conical member is carried by bearings from a stub axle. Where it is desired to mount the apertured discs outside the housing, however, preferably each conical member is formed as an extension of an axle passing through the wall of the housing, an apertured disc member being mounted on the end of the axle remote from the conical member and outside the wall of the housing.

The invention is illustrated in and further described with reference to the accompanying drawings in which.

Figure 1:
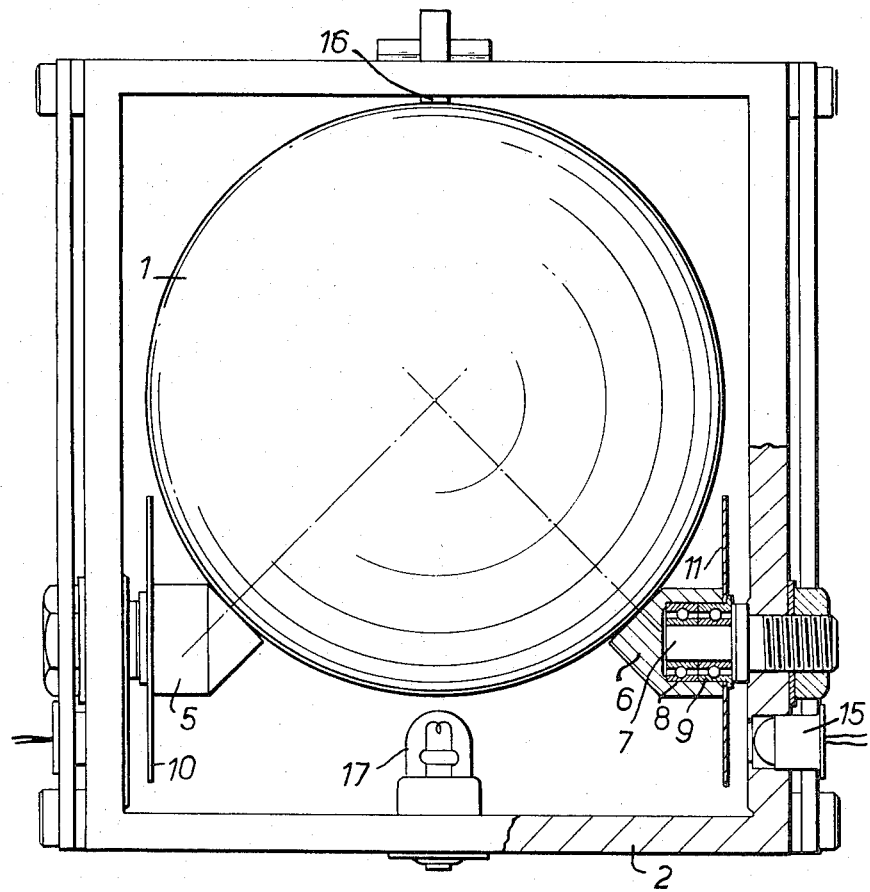
FIG. 1 is a cut away plane view of one tracker ball arrangement in accordance with the present invention.
Figure 2:
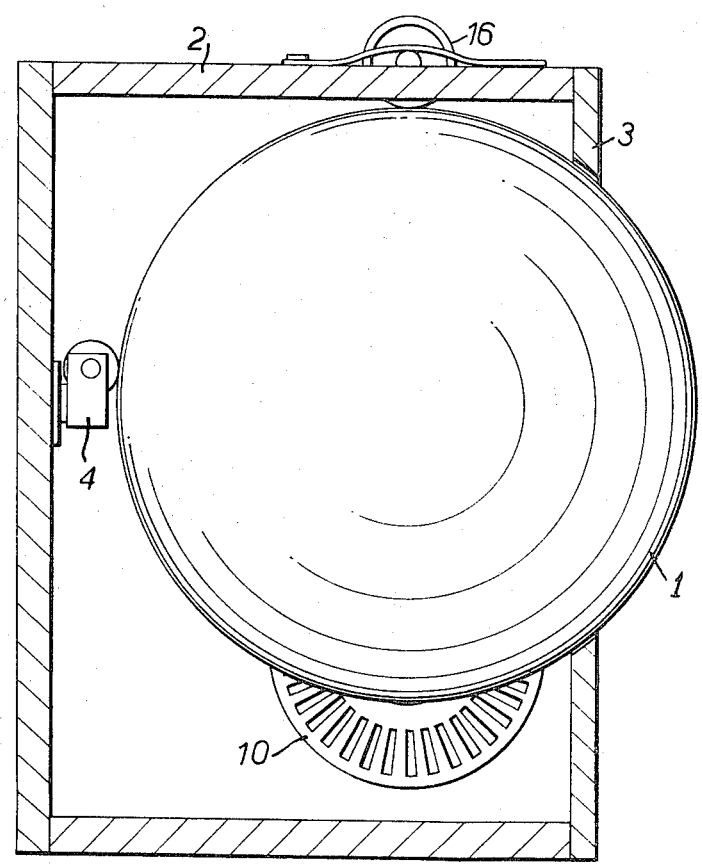
FIG. 2 is a side elevation and FIG. 3 a front elevation of the resolver of FIG. 1.
Figure 3:
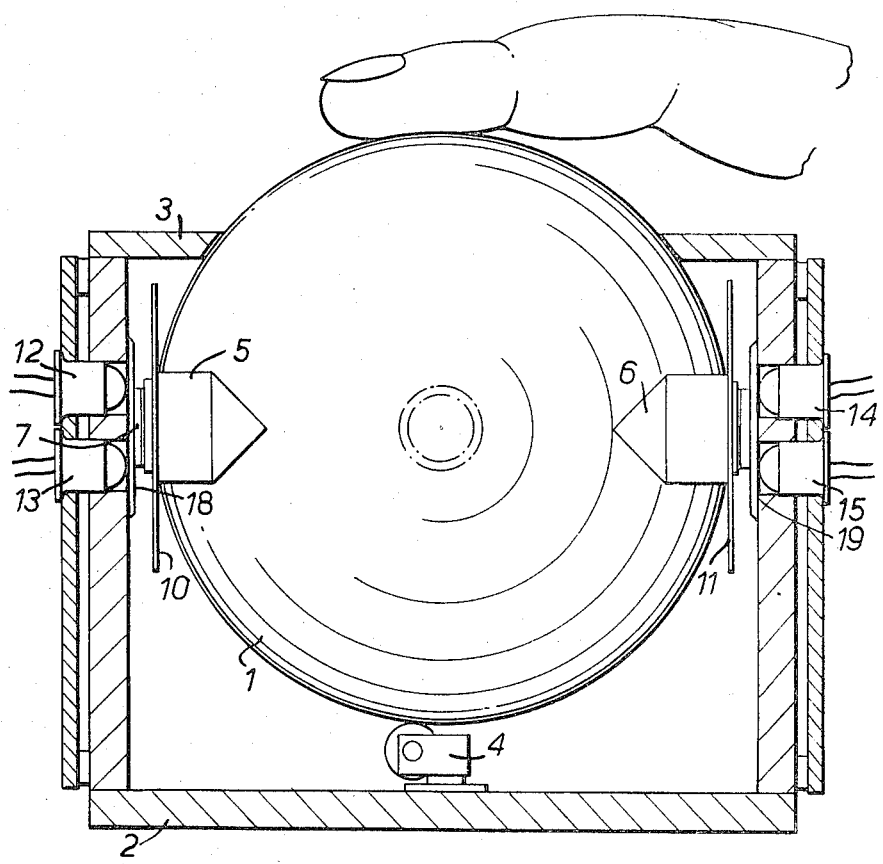

Referring to FIGS. 1, 2 and 3, a plastic ball 1 is contained within a housing 2 in such manner that it projects through a circular hole in the top 3 of the housing. The ball 1 sits upon a caster 4 so as to be rotatable by hand about any horizontal axis. Two cone members 5 and 6 are mounted on the horizontal axis through the center of the ball one in one side wall and the other in an opposite side wall. The cones 5 and 6 are so positioned that their conical surfaces make contact with the ball with an angle of 90° between them. Each cone member 5 and 6 is supported on a stub axle 7 by means of a pair of ball bearings 8 and 9. Each cone member carries a coded element, as shown an apertured disc 10 and 11 respectively, behind each of which is mounted a pair of photo transistors, 12, 13 and 14, 15, respectively. The ball 1 is biased towards the conical surfaces of the two cone members 5 and 6 by a spring loaded roller arrangement 16. Mounted on the wall of the container which joins the two walls carrying the cone members is a light bulb 17. As will be seen, the photo transistors 12 and 13 will receive light from the light bulb 17, with a frequency of flashing determined by the speed of rotation of the apertured disc 10 carried by the cone member 5 and with an order determined by the direction of rotation of the apertured disc 10, photo transistors 14 and 15 will receive flashes of light in a similar fashion but with a frequency of flashing and an order dependent upon the direction of rotation and rotation speed of the apertured disc 11. As will be seen the photo transistors 12, 13, 14 and 15 are let in to the wall by which they are carried and the access for light to them is limited by means of masking member 18 in the case of transistors of 12 and 13, and 19 in the case of transistors 14 and 15.

In operation the relative frequency of output signals from the transistors 12 and 13 on the one hand and transistors 14 and 15 on the otherhand will depend upon the plane in which the ball 1 is revolved, whilst the relative lead or lag of signals produced by transistors 12 and 13 and the relative lead or lag of signals produced by transistors 14 and 15 provide information regarding the direction of rotation. This information may be used in known manner as $x$ and $y$ co-ordinate information for controlling the movement of a spot on a television screen.

Provided the angle between the conical surfaces making contact with the ball is maintained at 90°, the position of the two cones may be re-arranged to alter the radii of the contacting surfaces and provide a desired ratio of rotation between the ball and the conical members.

Figure 4:
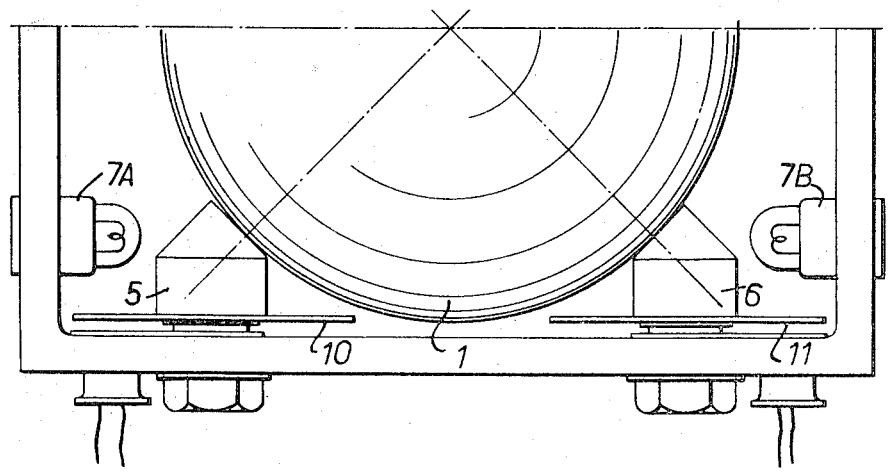
FIG. 4 illustrates an alternative arrangement of the cones used in FIG. 1.

Referring to FIG. 4, in the modification illustrated therein both conical members 5 and 6 are carried from a common wall. In effect, the conical members have both been turned through 90° compared to their dispositions in FIGS. 1 to 3, whilst still contacting the ball in the same positions. In addition, in order to achieve adequate strength of illumination two light bulbs 7a and 7b are provided, each positioned to illuminate a different one of the apertured discs 10 and 11. The construction shown in FIG. 4, whilst requiring two lamps has an advantage compared with the arrangement shown in FIGS. 1 and 3 in that production methods are simplified.

Figure 5:
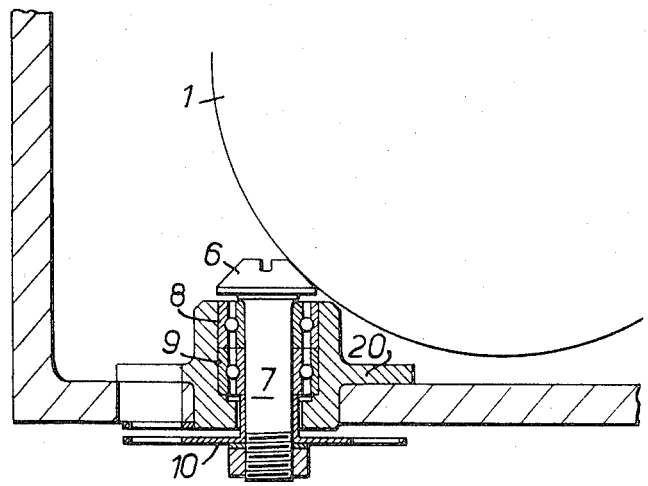
FIG. 5 illustrates an alternative arrangement for the cone bearings of FIG. 1.

Referring to FIG. 5 in the modification illustrated therein, the conical member 6 is formed as an extension of the axle 7, which axle passes through the wall of the container. The unitary conical member 6 and axle 7 are supported by a pair of bearings 8 and 9 within a housing 20. This construction enables the apertured disc 11 to be located on the outside of the container. The arrangement for the other conical member 5 is similar to allow apertured disc 10 to be carried on the outside of the container.

I claim:

1. In a tracker ball construction wherein a ball is rotatable in any of a plurality of planes and two coded elements are driven by the ball at relative speeds which vary in dependence jointly upon the speed of rotation of the ball and the plane in which it rotates: the combination of a housing; a ball mounted within said housing for rotation in any of a plurality of planes; a first rotatable member having a conical surface in contact with said ball; a first coded element operatively connected to said first rotatable conical member to be driven thereby; a second rotatable member having a conical surface in contact with said ball; and a second coded element operatively connected to said second rotatable member, the conical surfaces of the two rotatable members at their respective points of contact with said ball having an angle of 90° between them.

2. A tracker ball construction according to claim 1 in which said rotatable members are mounted for rotation on opposite walls of the housing.

3. A tracker ball construction according to claim 1 in which said rotatable members are mounted for rotation on the same wall of said housing.

4. A tracker ball construction according to claim 1 in which each of said coded elements comprises a rotatable apertured disc.

5. A tracker ball construction according to claim 1 in which means mounting said ball for rotation in said housing includes a caster.

* * * * *